(12) United States Patent
McKeown

(10) Patent No.: US 10,799,880 B2
(45) Date of Patent: Oct. 13, 2020

(54) METHOD AND APPARATUS FOR WASHING AND GRADING SILICA SAND FOR GLASS PRODUCTION

(71) Applicant: CDE Global Limited, Cookstown, County Tyrone (GB)

(72) Inventor: Christopher McKeown, Cookstown (GB)

(73) Assignee: CDE Global Limited, Cookstown, County (GB)

( * ) Notice: Subject to any disclaimer, the term of this patent is extended or adjusted under 35 U.S.C. 154(b) by 186 days.

(21) Appl. No.: 16/071,234

(22) PCT Filed: Jan. 12, 2017

(86) PCT No.: PCT/EP2017/050547
§ 371 (c)(1),
(2) Date: Jul. 19, 2018

(87) PCT Pub. No.: WO2017/125306
PCT Pub. Date: Jul. 27, 2017

(65) Prior Publication Data
US 2019/0329267 A1    Oct. 31, 2019

(30) Foreign Application Priority Data
Jan. 19, 2016 (GB) .................. 1600949.0

(51) Int. Cl.
*B03B 5/02* (2006.01)
*B07B 1/28* (2006.01)
*C03C 1/02* (2006.01)

(52) U.S. Cl.
CPC .................. *B03B 5/02* (2013.01); *B07B 1/28* (2013.01); *C03C 1/022* (2013.01); *B07B 2220/00* (2013.01); *B07B 2230/04* (2013.01)

(58) Field of Classification Search
CPC ......... B03B 5/02; B07B 1/28; B07B 2200/00; B07B 1/04; G01N 33/08
(Continued)

(56) References Cited

U.S. PATENT DOCUMENTS 4,222,529 A * 9/1980 Long .................. B03B 5/34
209/17
5,582,727 A * 12/1996 Foster .................. B01D 21/267
209/322

(Continued)

FOREIGN PATENT DOCUMENTS

GB   2531916    4/2016
JP   2004162265  6/2004
(Continued)

OTHER PUBLICATIONS

International Search Report of corresponding PCT Application No. PCT/EP2017/050547, dated Jan. 12, 2017.
(Continued)

*Primary Examiner* — Terrell H Matthews
(74) *Attorney, Agent, or Firm* — Gardner Linn

(57) ABSTRACT

A method of washing and grading silica sand for glass production includes removing trash and relatively large contaminants from a sand feed material via a sequence of multiple vibrating screens, collection sumps, hydrocyclones, a density separator, a classification tank, and a dewatering screen. The resulting silica sand product is suitable for glass production.

25 Claims, 1 Drawing Sheet

(58) Field of Classification Search
USPC .......................................................... 209/235
See application file for complete search history.

(56) References Cited

U.S. PATENT DOCUMENTS

| | | | | |
|---|---|---|---|---|
| 5,843,315 A | * | 12/1998 | Baughn | B01D 21/01 |
| | | | | 210/723 |
| 7,867,399 B2 | * | 1/2011 | Jones | C10G 33/00 |
| | | | | 175/66 |
| 2016/0138218 A1 | * | 5/2016 | Monclin | D21B 1/02 |
| | | | | 435/99 |

FOREIGN PATENT DOCUMENTS

| | | |
|---|---|---|
| JP | 2015217386 | 12/2015 |
| JP | 2015047601 | 3/2016 |

OTHER PUBLICATIONS

UK Search Report of corresponding UK Application No. GB1600949.0, dated Jan. 19, 2016.

* cited by examiner

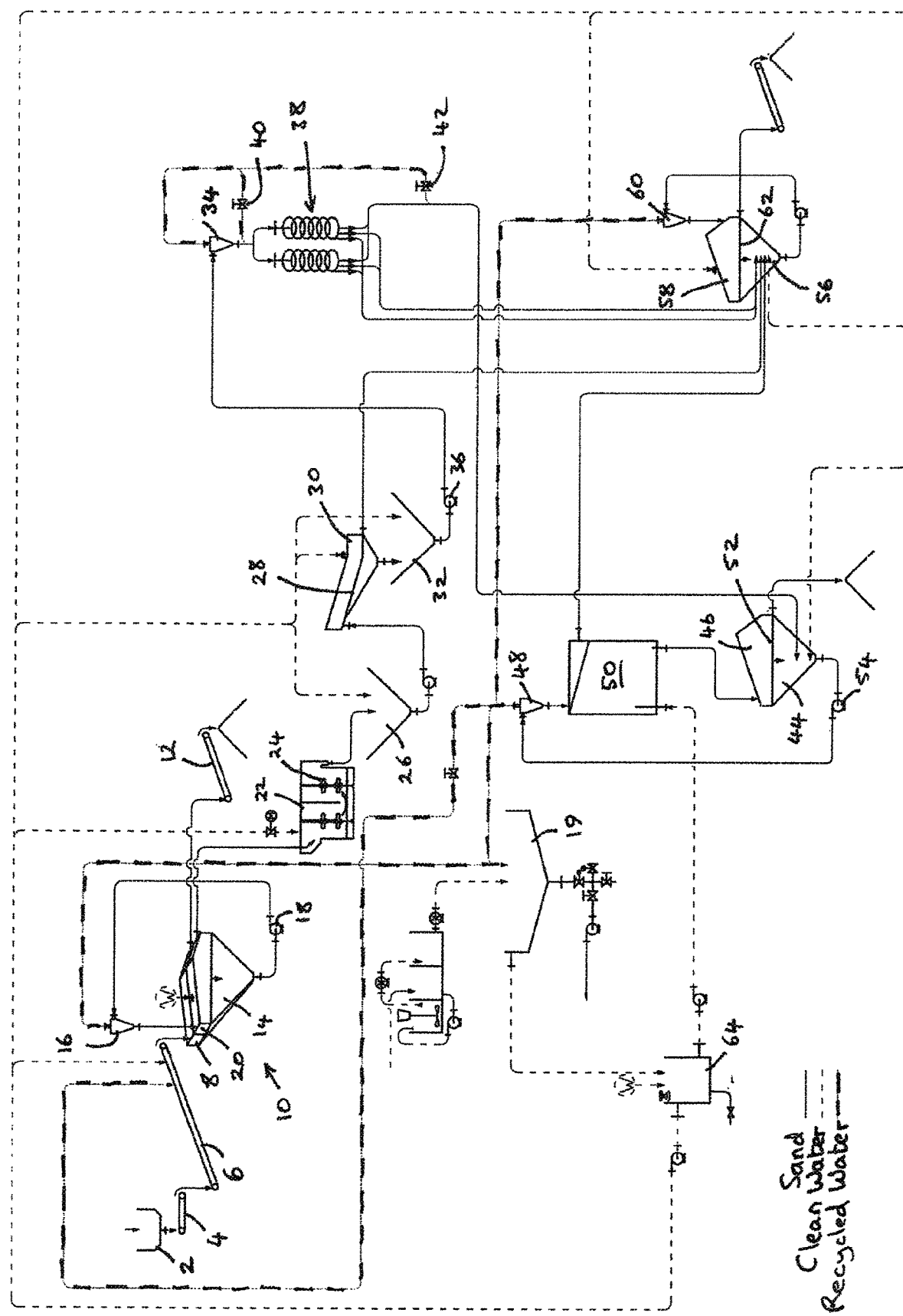

METHOD AND APPARATUS FOR WASHING AND GRADING SILICA SAND FOR GLASS PRODUCTION

CROSS REFERENCE TO RELATED APPLICATIONS

The present application is a § 371 national stage of International Application PCT/EP2017/050547, filed Jan. 12, 2017, which claims priority benefit of U.K. Pat. Application Ser. No. 1600949.0, filed Jan. 19, 2016, all of which are hereby incorporated herein by reference in their entireties.

FIELD OF THE INVENTION

This invention relates to a method and apparatus for washing and grading silica sand and in particular to a method and apparatus for washing and grading silica sand for glass production.

BACKGROUND OF THE INVENTION

Sand is typically washed and graded on a combination of vibrating screens and hydrocyclones to produce washed sand products having a predetermined grain size or range of grain size.

A typical vibrating screen includes a frame, defined by a pair of substantially parallel side walls interconnected by transversely extending bridging members, upon which is mounted a polyurethane deck having small openings or slots for water and/undersize particles to pass through. The frame is typically mounted on a base via resilient linkages, such as springs, and the frame, and thus the deck, is typically vibrated by means of a pair of counter rotating rotors defining eccentric masses, driven by one or more drive motors, to impart circular or reciprocating vibrating motion to the deck.

In a typical dewatering screen, the deck is mounted substantially horizontally, typically with at least a downstream end having a slight upwards slope (around 2°), and has a plurality of relatively small openings (approximately 0.5 mm diameter) for water to pass through. The deck is vibrated at high frequency to shake out excess water through the openings and to convey the material across the deck to one end of the screen whereby the dry material is discharged, typically over the top of a weir, onto a conveyor or into a collection hopper.

In a grading screen the deck is typically arranged at a predetermined downwards slope and material to be graded is delivered onto an upper end of the deck, typically entrained in a flow of water. The deck is vibrated at high frequency to convey the material over the deck and to cause undersize material (and water) to pass through the openings, oversize material being discharged from a lower end of the deck onto a conveyor or into a collection bay or hopper for subsequent processing or stockpiling.

A hydrocyclone is a device used to separate particles in a liquid suspension based on the ratio of their centripetal force to fluid resistance. This ratio is high for coarse particles and low for fine particles. A hydrocyclone typically includes a cylindrical section having an inlet for supplying a feed slurry into the hydrocyclone tangentially, and a conical base. Outlets are provided at upper and lower ends of the hydrocyclone. Underflow, containing the coarser fraction, passes out of the lower outlet while overflow, containing the finer fraction and most of the water, passes out of the outlet at the upper end of the hydrocyclone.

Most sand washing and grading plants are very large, including different stages comprising multiple grading and dewatering screens and hydrocyclones, and typically require a large volume of water to fluidise the sand in each stage of the process and to transfer the sand between different stages of the process.

The production of silica sands typically requires specialist screening and classification systems and the development of a silica sand processing system involves detailed analysis of materials. Both the particle size distribution and chemical composition of silica sand resource have an impact on the nature of the processing system to be deployed. As well as for glass production, silica sand is used for filter beds, the production of sodium silicates, and for sports surfaces and horticultural applications and for use as foundry sand.

SUMMARY OF THE INVENTION

According to a first aspect of the present invention there is provided a method of washing and grading silica sand for glass production comprising removing trash and relatively large contaminants from a sand feed material on a first vibrating screen, collecting undersize sand and water in a sump and separating fine contamination from the sand in a first hydrocyclone before passing the sand, carried in the underflow from the first hydrocyclone, onto a second vibrating screen whereupon undersize material and some water is removed from the sand before passing the oversize sand from the second vibrating screen into an attrition scrubber to delaminate clay and other contaminants from the sand, passing the sand from the attrition scrubber onto a third vibrating screen to remove an oversize fraction before passing the undersize sand from the third vibrating screen into a second hydrocyclone, passing the sand carried in the underflow from the second hydrocyclone into a density separator to remove relatively high density contaminants and relatively coarse material from the sand, passing the sand comprising a relatively low density fraction from the density separator into a third hydrocyclone and passing the sand as the underflow from the third hydrocyclone into a classification tank wherein an upwards flow of water removes fine contamination from the sand in an overflow from the classification tank and passing the sand collected in a lower end of the classification tank onto a dewatering screen for dewatering as a silica sand product suitable for glass production.

The method may further include adding a first portion of the overflow from the second hydrocyclone to the sand upstream of the density separator and adding a second portion of the overflow from the second hydrocyclone to the sand downstream of the density separator, and adjusting the ratio between the first and second portions of the overflow to adjust the water content of the material within the density separator.

The density separator may include one or more spiral separators.

The method may include the step of passing the low density fraction of the sand downstream of the density separator into the sump of the dewatering screen before passing the sand into the third hydrocyclone.

Optionally, the method includes dewatering the oversize material from the third vibrating screen and/or the relatively high density fraction from the density separator and/or the fine material separated in the overflow from the classification tank on a further dewatering screen to produce a by-product sand, for example for use as building sand. The by-product sand may be passed through a further hydrocyclone to remove fine contamination and some water therefrom before passing the by-product sand onto the further dewatering screen. The by-product sand may be passed into a sump of the further dewatering screen before passing it through the further hydrocyclone.

According to another aspect, the method includes passing the overflow from one or more of the first and third hydrocyclones into a settling tank, and passing water overflowing from the settling tank into a water store for reuse. A flocculent may be added to the settling tank to facilitate the settling out of suspended solid material in the settling tank. The method may include passing the water from the water store onto the first, second and third vibrating screens to fluidise material thereon, passing water from the water store into the classification tank to create the upwards flow of water therein and/or passing water from the water store is passed into the attrition scrubber to control the water content therein.

In one embodiment the method may include passing at least a portion of the overflow from the third hydrocyclone into the sand upstream of the first vibrating screen.

According to a further aspect of the present invention there is provided an apparatus for washing and grading silica sand for glass production comprising a first vibrating screen having a deck arranged to receive a feed material, oversize trash and aggregate material passing over the deck of the first vibrating screen and undersize material being collected in a sump of the first vibrating screen, a first hydrocyclone receiving undersize material from the sump of the first vibrating screen, a second vibrating screen receiving an underflow from the first hydrocyclone upon a deck thereof, an attrition scrubber being arranged to receive oversize material from the deck of the second vibrating screen to delaminate clay and other impurities from the material, a third vibrating screen having a deck arranged to receive material from the attrition scrubber, the third vibrating screen having a sump receiving undersize material from the deck of the third vibrating screen, a second hydrocyclone being arranged to receive the undersize material from the sump of the third vibrating screen, a density separator being arranged to receive the underflow from the second hydrocyclone to produce a low density fraction and a high density fraction, a third hydrocyclone being arranged to received the low density fraction from the density separator, a classification tank receiving the underflow from the third hydrocyclone, wherein the classification tank incorporates at least one water inlet providing a upwards flow of water therein, material collected in a lower end of the classification tank being passed onto a dewatering screen from which is delivered the washed and classified silica sand product.

Optionally, a first flow control valve is provided for controlling the addition of a first portion of the overflow from the second hydrocyclone to the material upstream of the density separator, a second control valve being provided for controlling the addition of a second portion of the overflow from the second hydrocyclone to the material downstream of the density separator, the first and second control valves being operated to control the ratio between the first and second portions of the overflow to control the water content of the material within the density separator.

The density separator may include at least one spiral separator comprising a substantially vertically aligned spirally extending sluice down which the material is arranged to flow, one or more adjustable bars, channels, or slots, being provided at or adjacent a lower end of the sluice for separating material into the low and high density fractions. The low density fraction of the material from the density separator may be passed into a sump of the dewatering screen before being pumped into the third hydrocyclone.

The first and second vibrating screens may include respective sides of a split deck vibrating screen having a common sump. Alternatively they may include separate screens, depending upon the throughput of the apparatus.

A further dewatering screen may be provided for dewatering the oversize material from the third vibrating screen and/or the relatively high density fraction removed from the sand from the density separator and/or the fine material separated in the overflow from the classification tank to produce a by-product sand, for example for use as building sand. A further hydrocyclone may be provided for receiving the oversize material from the third vibrating screen and/or the relatively high density fraction removed from the sand from the density separator and/or the fine material separated in the overflow from the classification tank to remove fine contamination therefrom, the material passing out of the underflow of the further hydrocyclone onto the further dewatering screen. The oversize material from the third vibrating screen and/or the relatively high density fraction removed from the sand from the density separator and/or the fine material separated in the overflow from the classification tank may be passed into the sump of the further dewatering screen before being pumped into the further hydrocyclone.

Optionally, a settling tank receiving the overflow from the first, third and further hydrocyclones (where provided), wherein suspended solids settle out of suspension within the settling tank, water from the settling tank being passed into a water store for reuse. The settling tank may include a dosing device for adding a flocculent to the slurry in the settling tank.

Water from the water store may be passed into one or more of the first, second and third vibrating screens to fluidise material thereon and/or into the classification tank to create the upwards flow of water therein and/or into the attrition scrubber to control the water content therein. At least a portion of the underflow from the third hydrocyclone may be passed in the feed material upstream of the first vibrating conveyor to fluidise the feed material.

These and other objects, advantages and features of the invention will become apparent upon review of the following specification in conjunction with the drawings.

BRIEF DESCRIPTION OF THE DRAWING

An apparatus for washing and grading silica sand for glass production in accordance with an embodiment of the present invention will now be described, by way of example only, with reference to the accompanying drawings, in which:

FIG. 1 is a schematic illustration of an apparatus for washing and grading silica sand for glass production.

DETAILED DESCRIPTION

An apparatus for washing and grading silica sand for glass production in accordance with an embodiment of the present invention is illustrated in the drawings.

As illustrated in FIG. 1, an apparatus for washing and grading silica sand for glass production includes a feed hopper 2 for receiving feed material to be washed and graded, said feed material being conveyed via suitable belt conveyors 4,6 onto a first deck 8 of a split deck vibrating screen 10. Water is added to the feed material as it is delivered onto the first deck 8 of the split deck screen 10 so that sand is fluidised in the water.

The first deck 8 of the split deck screen 10 has relatively large apertures formed therein, wherein the sand and water passes through the apertures in the deck 8 while trash and other large contaminants pass over the deck 8 to be delivered onto a conveyor 12 to be delivered onto a stock pile for later disposal.

The sand and water collected in the sump 14 of the split deck screen is pumped to a first hydrocyclone 16 by means of a suitable pump 18, in which fine contaminants and silt are separated from the sand, as is known in the art.

An underflow from the first hydrocyclone 16, containing partially washed sand, having fine contamination and silts removed therefrom, is passed onto a second deck 20 of the split deck screen 10, having relatively fine apertures formed therein, relatively fine material, such as silt, and water passing through the apertures of the second deck 20 into the sump 14. The overflow from the first hydrocyclone 16, containing fine contaminants removed from the sand, is passed to a settling tank 19 for recycling, as will be described below in more detail.

The remaining, now at least partially washed and partially dewatered sand, passes over a downstream end of the second deck 20 of the split deck screen 10 to pass into an attrition scrubber 22, preferably containing several attrition cells to provide sufficient residence time, each cell having two or more sets of blades 24 (three in the embodiment shown) mounted on a common shaft driven by a respective drive motor, typically an electric motor, such that the movement of the blades 24 cause intense scrubbing, polishing and disintegration of the particulate material located within each cell, whereby clay and other remaining fine contaminants are delaminated clay from the sand particles. The particulate material is typically delivered to the attrition scrubber as a liquid slurry having water content of around 20% by weight. Water may be added to the attrition scrubber 22 to provide the required water content therein for efficient operation of the attrition scrubber 22.

Sand from the attrition scrubber 22 is delivered into a collection sump 26 from which it is pumped onto the deck 28 of a further vibrating screen 30 for separating oversized material from the sand, said deck 28 typically having a cut point of 600 µm. Further 20 water may be added to the sump 26 and/or deck 28 of the screen 30 to maintain fluidisation of the sand to ensure efficient and reliable grading of the sand upon the deck 28 of the screen 30.

Sand and water passing through the apertures in the deck 28 of the screen 30 are collected in the sump 32 thereof and pumped into a second hydrocyclone 34 via a suitable pump 36.

The underflow from the second hydrocyclone 34 is passed into a density separator 38 for separating the sand into a relatively high density fraction and a relatively low density fraction. The density separator will removed higher density contamination from the sand, such as iron ore, that cannot be otherwise be removed by simply grading the material by size.

The density separator 38 may include one or more spiral separators of the wet type, also called spiral concentrators, wherein the feed material, fluidised in water, is separated into fractions based upon particle density. Such spiral separators include a tower, around which is wound a sluice. Larger and heavier particles sink to the bottom of the sluice faster and experience more drag from the bottom, thus travelling more slowly, and so move towards the centre of the spiral. Conversely, lower density particles tend to stay towards the outside of the spiral, with the water, and quickly reach the bottom. At the bottom, a "cut" is made with a set of adjustable bars, channels, or slots, separating the low and high density fractions of the material. Where more than one spiral separator is used they are preferably arranged in parallel.

Typical spiral concentrators will use a sand/water slurry from about 20%-40% solids by weight. To control the water concentration of the sand/water slurry within the density separator, the overflow from the second hydrocyclone 34 is returned to the slurry at two separate points, respectively upstream and downstream of the density separator, control valves 40, 42 being used to control the relative proportions of the overflow that are passed into the slurry at said two separate points. To increase the water content of the slurry within the density separator a greater proportion of the overflow from the second hydrocyclone 34 is passed into the slurry upstream of the density separator, whereas to reduce the water content of the slurry within the density separator a greater proportion of the overflow from the second hydrocyclone 34 is passed into the slurry downstream of the density separator.

The low density fraction of the slurry from the density separator is passed into the sump 44 of a dewatering screen 46 from which it is pumped, via a suitable pump 54, to a third hydrocyclone 48. The underflow from the third hydrocyclone is passed into a classification tank 50 in which an upwardly directed flow of water performs a final washing stage, removing fine material from the sand product, the sand product collecting in a lower end of the classification tank from where it is passed onto the deck 52 of the dewatering screen 46, upon which it is dewatered before being passed onto a stockpile as a final washed and graded sand product suitable for glass production, typically having a particle size between 0.15 and 0.60 mm. The overflow from the third hydrocyclone 48 may be passed back to the settling tank 19 for recycling. A portion of the overflow from the third hydrocyclone 48 may be passed back to the feed material upstream of the first deck 8 of the split deck screen 10 to facilitate fluidisation of the feed material.

The mixture of very fine material and water overflowing from the classification tank 50, along with the high density fraction from the density separator 38 and the material passing over the deck 28 of the further vibrating screen 30 may all be collected in the sump 56 of a further dewatering screen 58, with additional water if necessary, before being pumped to a further hydrocyclone 60 to be dewatered and for removal of fine contaminants, before being passed from the underflow of the hydrocyclone 60 onto the deck 62 of the further dewatering screen 58, upon which the sand may be dewatered before being conveyed onto a stockpile as a by-product, which may be sold as building sand.

As discussed above, the overflow from each of the first 16, third 48 and optional further 60 hydrocyclones are preferably passed into a settling tank 19. A suitable flocculent may be added to the settling tank to facilitate the settling out of the sludge from the water. The sludge collected in the bottom of the settling tank may be pumped for disposal, for example is a sludge pond, while water overflowing from the settling tank 19 may be collected in a water storage tank 64, from which it may be recycled for use in the washing and grading process, for example for addition to the sand as it is passed onto the split deck screen 10, for addition to the attrition scrubber 24 to control the water content of the slurry therein, to control the water content of the sand both upstream and downstream of the further vibrating screen 30, for addition to the sump of the dewatering screen 46 and/or the further dewatering screen 58 or onto the deck of the further dewatering screen 58 to facilitate further grading of the by-product sand. Water from the water storage tank 64 may also be pumped into the classification tank 50 to create the required upwards flow of water therein for classification of the sand therein. The final cleaning stage enacted by the classification tank 50 upstream of the dewatering screen 46 ensures that any fine contamination contained within this recycled water stream is removed from the sand product prior to its final dewatering, enabling the use of such recycled water in place of clean additional water and thus minimising the water consumption of the entire apparatus.

As such, the present invention provides an improved sand washing and grading apparatus that can provide a silica sand product suitable for glass production with low water consumption and in a compact and efficient arrangement.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A method of washing and grading silica sand for glass production comprising:
   removing oversize trash and relatively large contaminants from a feed material and an aggregate material on a first vibrating screen having a deck;
   collecting undersize material and water in a sump of the first vibrating screen;
   receiving the undersize material in a first hydrocyclone from the sump of the first vibrating screen;
   separating fine contamination from the undersize material in the first hydrocyclone;
   receiving an underflow from the first hydrocyclone onto a deck of a second vibrating screen and removing undersize material and some water from the underflow from the first hydrocyclone;
   passing oversize material from the second vibrating screen into an attrition scrubber and delaminating clay and other contaminants from the oversize material from the second vibrating screen;
   passing the material from the attrition scrubber onto a third vibrating screen and removing an oversize fraction of the material received from the attrition scrubber;
   collecting undersize material from the third vibrating screen to a sump of the third vibrating screen;
   passing the undersize material from the sump of the third vibrating screen into a second hydrocyclone;
   passing material carried in an underflow from the second hydrocyclone into a density separator and removing relatively high density contaminants and relatively coarse material from the material carried in the underflow from the second hydrocyclone;
   passing the material comprising a relatively low density fraction from the density separator into a third hydrocyclone;
   passing the material carried in an underflow from the third hydrocyclone into a classification tank;
   directing an upwards flow of water through at least one water inlet in the classification tank to remove fine contamination from the material in an overflow from the classification tank;
   passing sand collected in a lower end of the classification tank onto a dewatering screen and dewatering and delivering the sand as a silica sand product suitable for glass production.

2. A method as claimed in claim 1, comprising adding a first portion of the overflow from the second hydrocyclone to the sand upstream of the density separator and adding a second portion of the overflow from the second hydrocyclone to the sand downstream of the density separator, and adjusting the ratio between the first and second portions of the overflow to adjust the water content of the material within the density separator.

3. A method as claimed in claim 2, wherein the density separator comprises one or more spiral separators for separating a feed material in a lower density fraction and a high density fraction.

4. A method as claimed in claim 1, comprising passing the low density fraction of the sand downstream of the density separator into the sump of the dewatering screen before passing said sand into the third hydrocyclone.

5. A method as claimed in claim 1, comprising dewatering the oversize material from the third vibrating screen and/or the relatively high density fraction from the density separator and/or the fine material separated in the overflow from the classification tank on a further dewatering screen to produce a by-product sand, for example for use as building sand.

6. A method as claimed in claim 5, comprising passing the by-product sand through a further hydrocyclone to remove fine contamination and some water therefrom before passing the by-product sand onto the further dewatering screen.

7. A method as claimed in claim 6, comprising collecting the by-product sand in a sump of the further dewatering screen before passing it through the further hydrocyclone.

8. A method as claimed in claim 1, comprising passing the overflow from one or more of said first and third hydrocyclones into a settling tank, and passing water overflowing from the settling tank into a water store for reuse.

9. A method as claimed in claim 8, comprising adding a flocculent to the settling tank to facilitate the settling out of suspended solid material in the settling tank.

10. A method as claimed in claim 8, comprising passing water from said water store onto said first, second and third vibrating screens to fluidise material thereon.

11. A method as claimed in claim 8, comprising passing water from said water store into said classification tank to create said upwards flow of water therein.

12. A method as claimed in claim 8, comprising passing water from said water store is passed into the attrition scrubber to control the water content therein.

13. A method as claimed in claim 1, comprising passing at least a portion of the overflow from the third hydrocyclone into the sand upstream of the first vibrating screen.

14. An apparatus for washing and grading silica sand for glass production comprising a first vibrating screen having a deck arranged to receive a feed material, oversize trash and aggregate material passing over the deck of said first vibrating screen and undersize material being collected in a sump of said first vibrating screen, a first hydrocyclone receiving undersize material from the sump of the first vibrating screen, a second vibrating screen receiving an underflow from the first hydrocyclone upon a deck thereof, an attrition scrubber being arranged to receive oversize material from the deck of the second vibrating screen to delaminate clay and other impurities from said material, a third vibrating screen having a deck arranged to receive material from said attrition scrubber, said third vibrating screen having a sump receiving undersize material from the deck of the third vibrating screen, a second hydrocyclone being arranged to receive said undersize material from said sump of the third vibrating screen, a density separator being arranged to receive said underflow from said second hydrocyclone to produce a low density fraction and a high density fraction, a third hydrocyclone being arranged to received said low density fraction from said density separator, a classification tank receiving the underflow from said third hydrocyclone, wherein said classification tank incorporates at least one water inlet providing a upwards flow of water therein, material collected in a lower end of said classification tank being passed onto a dewatering screen from which is delivered the washed and classified silica sand product.

15. An apparatus as claimed in claim 14, wherein a first flow control valve is provided for controlling the addition of a first portion of the overflow from the second hydrocyclone to the material upstream of the density separator, a second control valve being provided for controlling the addition of a second portion of the overflow from the second hydrocyclone to the material downstream of the density separator, the first and second control valves being operated to control the ratio between the first and second portions of the overflow to control the water content of the material within the density separator.

16. An apparatus as claimed in claim 15, wherein the density separator comprises at least one spiral separator comprising a substantially vertically aligned spirally extending sluice down which the material is arranged to flow, one or more adjustable bars, channels, or slots, being provided at or adjacent a lower end of the sluice for separating material into said low and high density fractions.

17. An apparatus as claimed in claim 14, wherein said low density fraction of the material from the density separator is passed into a sump of the dewatering screen before being pumped into the third hydrocyclone.

18. An apparatus as claimed in claim 14, wherein the first and second vibrating screens comprise respective sides of a split deck vibrating screen having a common sump.

19. An apparatus as claimed in claim 14, comprising a further dewatering screen for dewatering the oversize material from the third vibrating screen and/or the relatively high density fraction removed from the sand from the density separator and/or the fine material separated in the overflow from the classification tank to produce a by-product sand, for example for use as building sand.

20. An apparatus as claimed in claim 19, comprising a further hydrocyclone for receiving the oversize material from the third vibrating screen and/or the relatively high density fraction removed from the sand from the density separator and/or the fine material separated in the overflow from the classification tank to remove fine contamination therefrom, said material passing out of the underflow of the further hydrocyclone onto said further dewatering screen.

21. An apparatus as claimed in claim 20, wherein the oversize material from the third vibrating screen and/or the relatively high density fraction removed from the sand from the density separator and/or the fine material separated in the overflow from the classification tank is passed into the sump of the further dewatering screen before being pumped into the further hydrocyclone.

22. An apparatus as claimed in claim 20, further comprising a settling tank receiving the overflow from the first, third and further hydrocyclones, wherein suspended solids settle out of suspension within said settling tank, water from the settling tank being passed into a water store for reuse.

23. An apparatus as claimed in claim 22, wherein the settling tank includes a dosing device for adding a flocculent to the slurry in the settling tank.

24. An apparatus as claimed in claim 22, wherein water from said water store is passed into one or more of said first, second and third vibrating screens to fluidise material thereon and/or into said classification tank to create said upwards flow of water therein and/or into the attrition scrubber to control the water content therein.

25. An apparatus as claimed in claim 14, wherein at least a portion of the underflow from the third hydrocyclone is passed in the feed material upstream of said first vibrating conveyor to fluidise said feed material.

* * * * *